United States Patent [19]
Engbersen et al.

[11] Patent Number: 5,549,391
[45] Date of Patent: Aug. 27, 1996

[54] LINEAR ANTIFRICTION BEARING AND CAGE THEREFOR

[75] Inventors: Gerhard Engbersen, Romanshorn, Switzerland; Heinz Greiner, Ebersbach, Germany; Peter Schorscher, Salmsach, Switzerland

[73] Assignee: Hydrel AG, Romanshorn, Switzerland

[21] Appl. No.: 554,397

[22] Filed: Nov. 6, 1995

Related U.S. Application Data

[63] Continuation of Ser. No. 119,164, filed as PCT/CH93/00012, Jan. 20, 1993 published as WO93/14326, Jul. 22, 1993, abandoned.

[30] Foreign Application Priority Data

Jan. 21, 1992 [DE] Germany ............................ 42 01 453.0

[51] Int. Cl.$^6$ ............................................. F16C 29/04
[52] U.S. Cl. ............................................. 384/51; 384/56
[58] Field of Search ............................... 384/49, 50, 51, 384/53, 55, 56

[56] References Cited

U.S. PATENT DOCUMENTS

| | | | |
|---|---|---|---|
| 3,927,919 | 12/1975 | Bunzli | 384/51 |
| 4,701,059 | 10/1987 | Yokota | 384/51 |
| 4,991,981 | 2/1991 | Baxter | 384/49 |

FOREIGN PATENT DOCUMENTS

| | | |
|---|---|---|
| 3626174 | 2/1988 | Germany. |
| 56-109922 | 8/1981 | Japan. |

*Primary Examiner*—Lenard A. Footland
*Attorney, Agent, or Firm*—Stroock & Stroock & Lavan

[57] ABSTRACT

The linear bearing consists of two identical rails (2, 3), each with two V-shaped grooves (10), in each of which a row of rolls (4) rolls off. The rolls (4) are contained in a ribbon-shaped flat cage (5) and are held there positively and captively. A high load capacity, economical manufacture, and a longer lifetime are achieved thereby.

10 Claims, 6 Drawing Sheets

5,549,391

1

LINEAR ANTIFRICTION BEARING AND CAGE THEREFOR

CROSS REFERENCE TO RELATED APPLICATIONS

This is a continuation of application Ser. No. 08/119,164, filed as PCT/CH93/00012, Jan. 20, 1993 published as WO93/14326, Jul. 22, 1993, abandoned.

The so-called M-V linear antifriction bearing is well known as a linear roller bearing. It consists of a rail with an M-shaped cross section and of a second rail with a V-shaped cross section. Two rows of rollers are held in between, in a cage with a V-shaped cross section. These M-V bearings have a high load capacity. However, they are somewhat expensive to manufacture.

On the other hand, so Called cross-roll bearings are well known, in which each of the two rails has a V-shaped groove with two tracks. The sub-square rollers are alternately oriented in one or the other direction. The cage surrounds the rollers at their face sides. As a result, their length must be much less than their diameter. With these cross-roll bearings, the number of rollers oriented toward one side can also be different from the number of rollers oriented toward the other side. In this way, the bearing can be adapted to the prevailing transverse load. However, a relatively expensive cage design is necessary for this. In this design, the cage consists of a large number of plastic parts that are connected together so that they can pivot about the longitudinal axis of the cage. Each of these plastic parts holds one roller. Cross-roll bearings are cheaper to manufacture than M-V bearings, but they have a lower load capacity, given the same dimensions.

The present invention is based on the task of combining the advantages of the two types of linear roller bearings described above without having to accept their disadvantages, and also of creating an economical cage. This task is accomplished by the combination of features in the claims.

The linear antifriction bearing of the present invention has a much smaller cross section than a cross-roll bearing with the same load capacity, and can be manufactured more economically than an M-V bearing with the same load capacity, because two identical rails can be used. Compared to the known linear bearings, the linear bearing according to the invention furthermore has the advantage of a considerably longer lifetime: If one set of tracks is worn, the cage with the rollers can be turned around. The rolls then run in a second set of tracks that are still free of wear. The lifetime of the rails thus can be practically doubled.

The cage of the present invention is considerably more economical and makes possible the use of broader rollers than cages of known cross-roll bearings, and it is cheaper to manufacture than cages of M-V bearings, because it practically can be stamped from only one flat ribbon.

Embodiments of the invention are explained below with reference to the drawings, in which.

2

Figure 6:
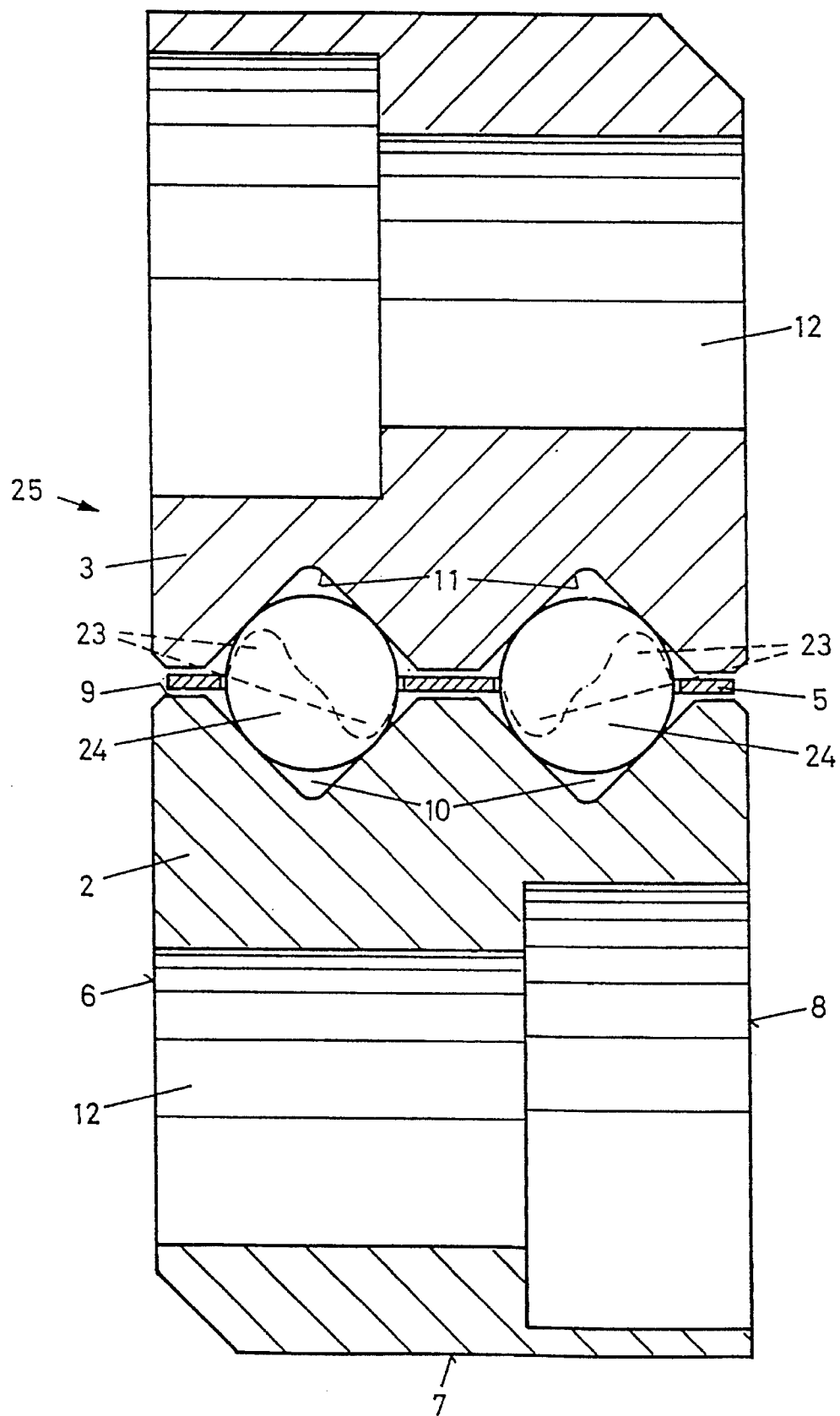
Figure 7:
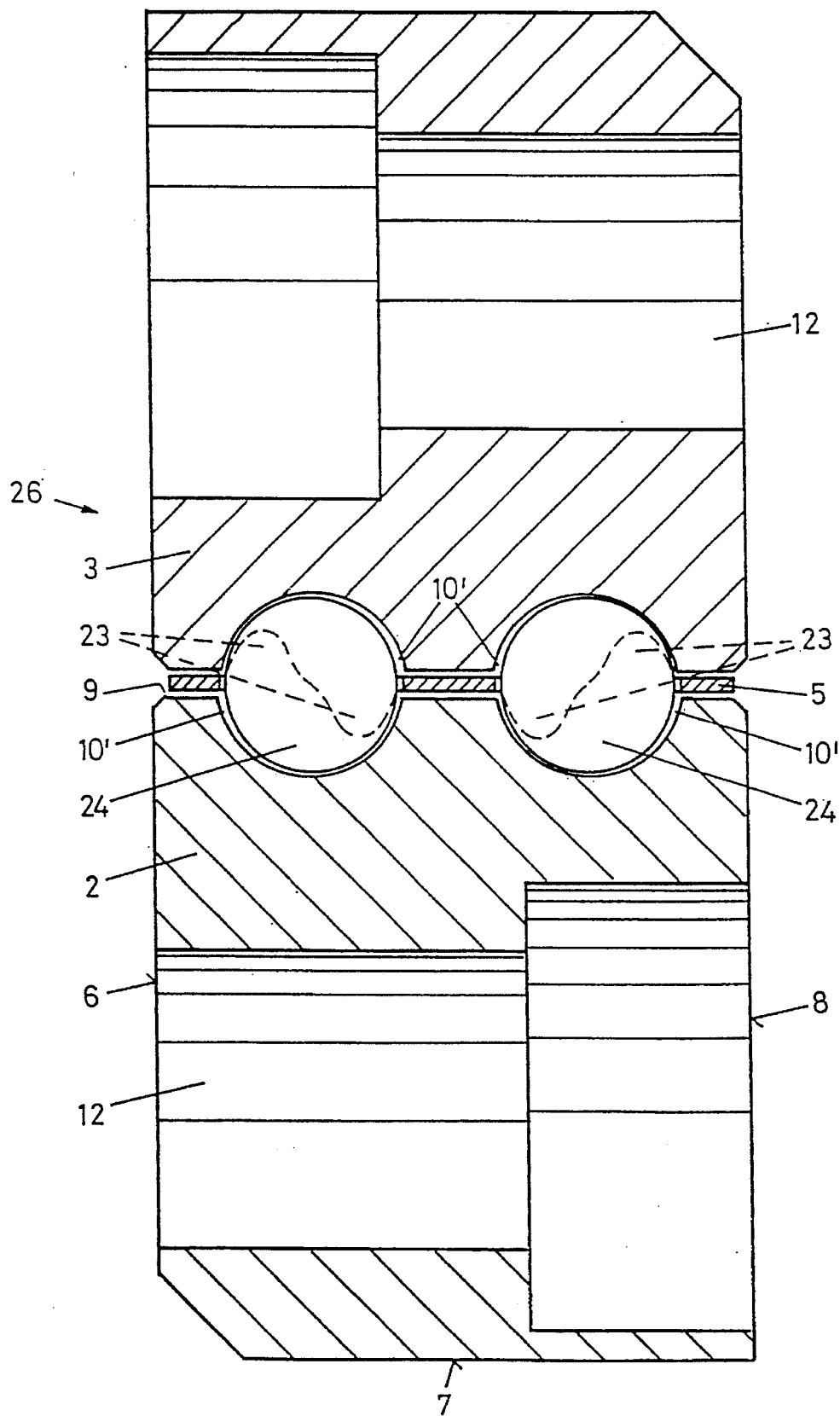

FIG. 6 and FIG. 7 show two variants of a linear ball bearing.

Figure 1:
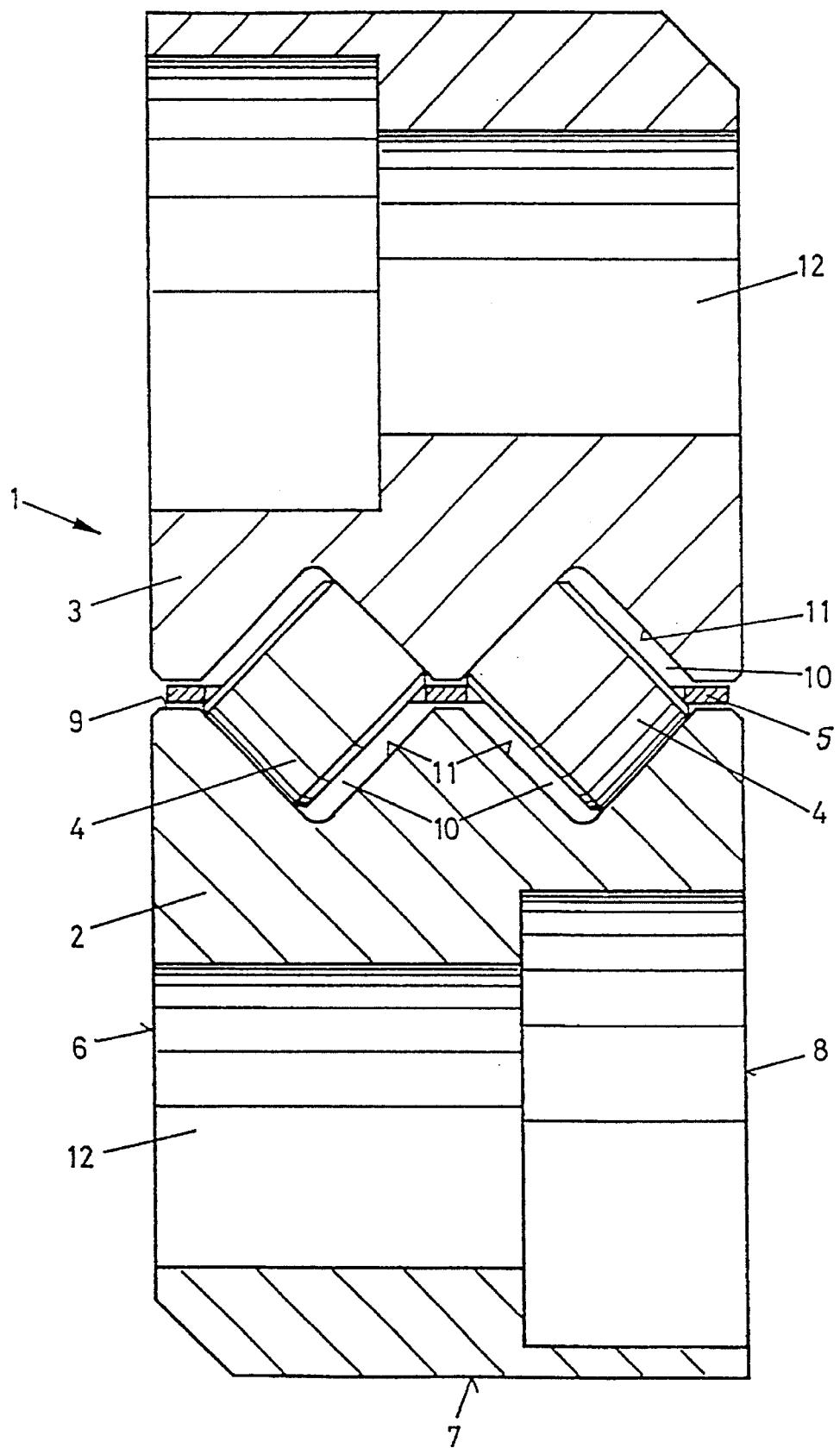
FIG. 1 shows a cross section through a linear roller bearing.
Figure 2:
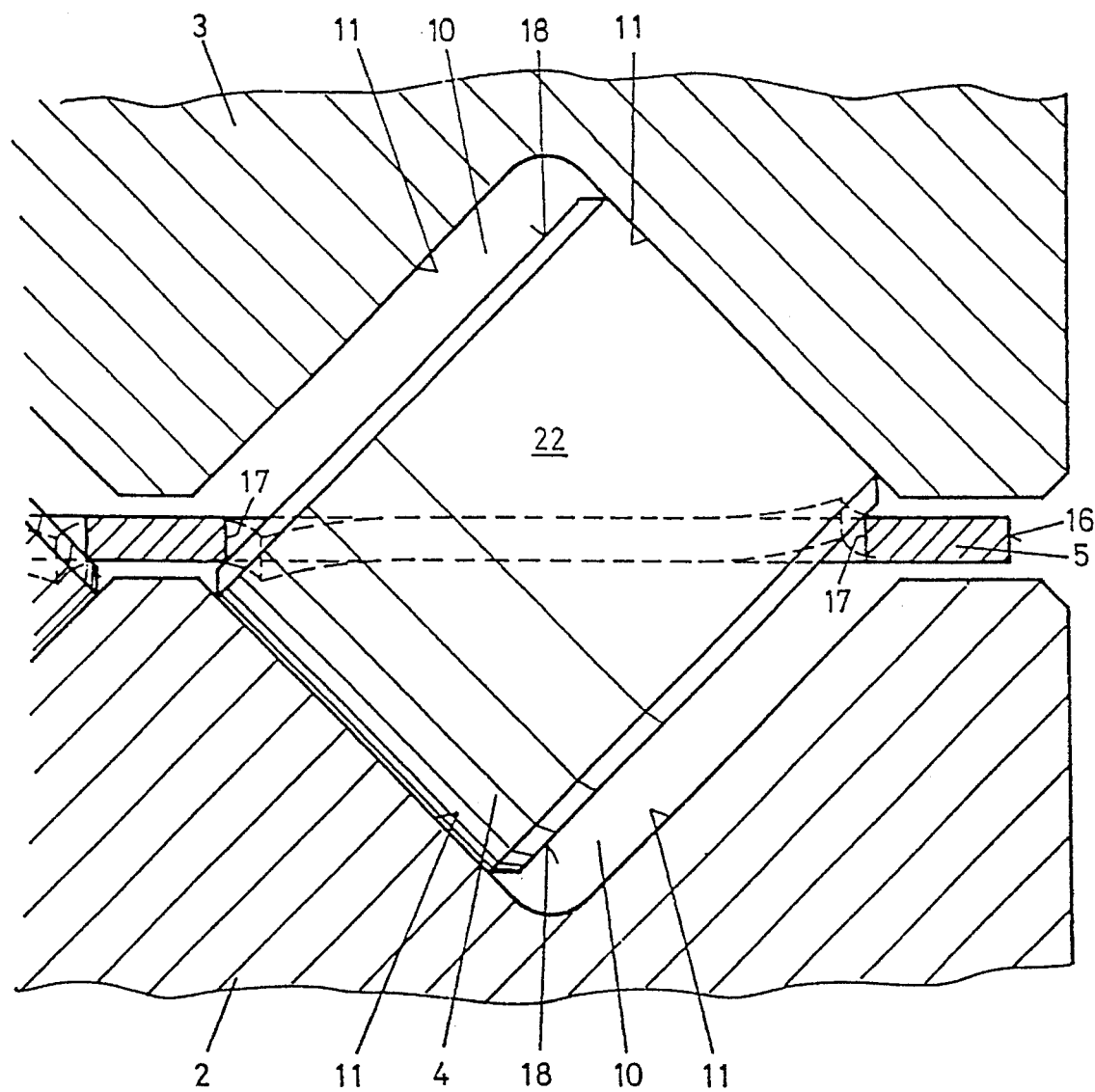
FIG. 2 shows an enlarged detail from the representation of FIG. 1.

The linear bearing 1 according to FIG. 1 consists of two identical rails 2, 3, several rollers 4 each having a diameter which is larger than its axial length, and a cage 5 which holds the rollers 4 in regular spacings. Each rail 2, 3 has an essentially rectangular cross section with flat-ground surfaces 6, 7, 8, 9. Two V-shaped longitudinal grooves 10 are ground into the mutually facing and mutually parallel surfaces 9. They have two mutually perpendicular tracks 11 for the rollers 4. Every two mutually opposite grooves 10 of the two rails 2, 3 together form a square in cross section. For fastening, the rails 2, 3 furthermore have a series of throughholes 12 with counter-sinks 11.

The cage 5 (FIGS. 3–5) has two series of regularly spaced openings 15, into which the rollers 4 are inserted. Each of the rolls is held form lockingly in all directions, the axis of the rolls being inclined to the plane of the cage by about 45°. Each opening 15 has two contact shoulders 17, which run parallel to the longitudinal edge 16 of the cage 5, and which contact the opposite frontal surfaces 18 of the rolls 4 under a slight pre-tension. For this purpose, the contact shoulders 17 are formed on short, spring-type tabs 19. Every two are shaped edges 20 of the opening 13 loin the shoulders 17 to one another. Each edge 20 has two contact points 21 adjacent to the two shoulders 17. At these contact points, the cage 5 contacts the cylindrical outer circumference 22 of the rollers 4. Through this design, the rollers 4 are held positively form lockingly and captively in the openings 15; they are snapped into the openings.

Figure 3:
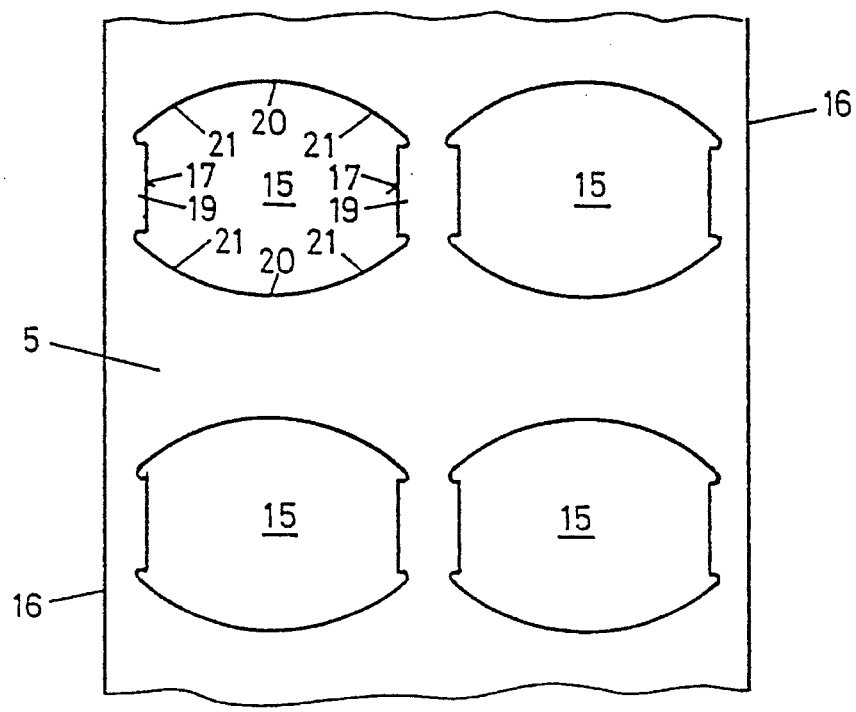
FIG. 3 and FIG. 4 show top views of two variants of the cage.
Figure 4:
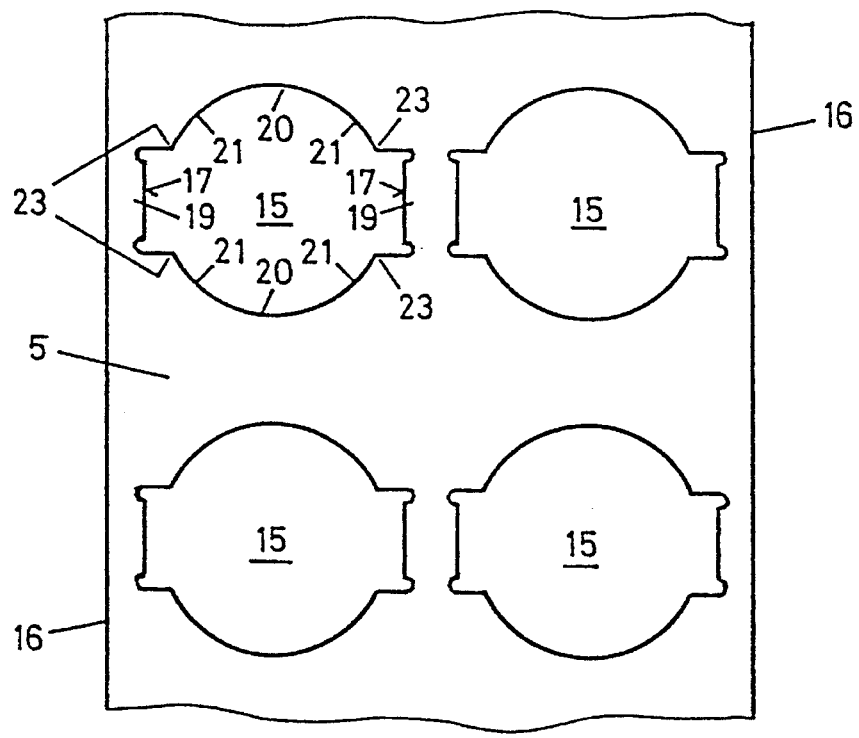
Figure 5:
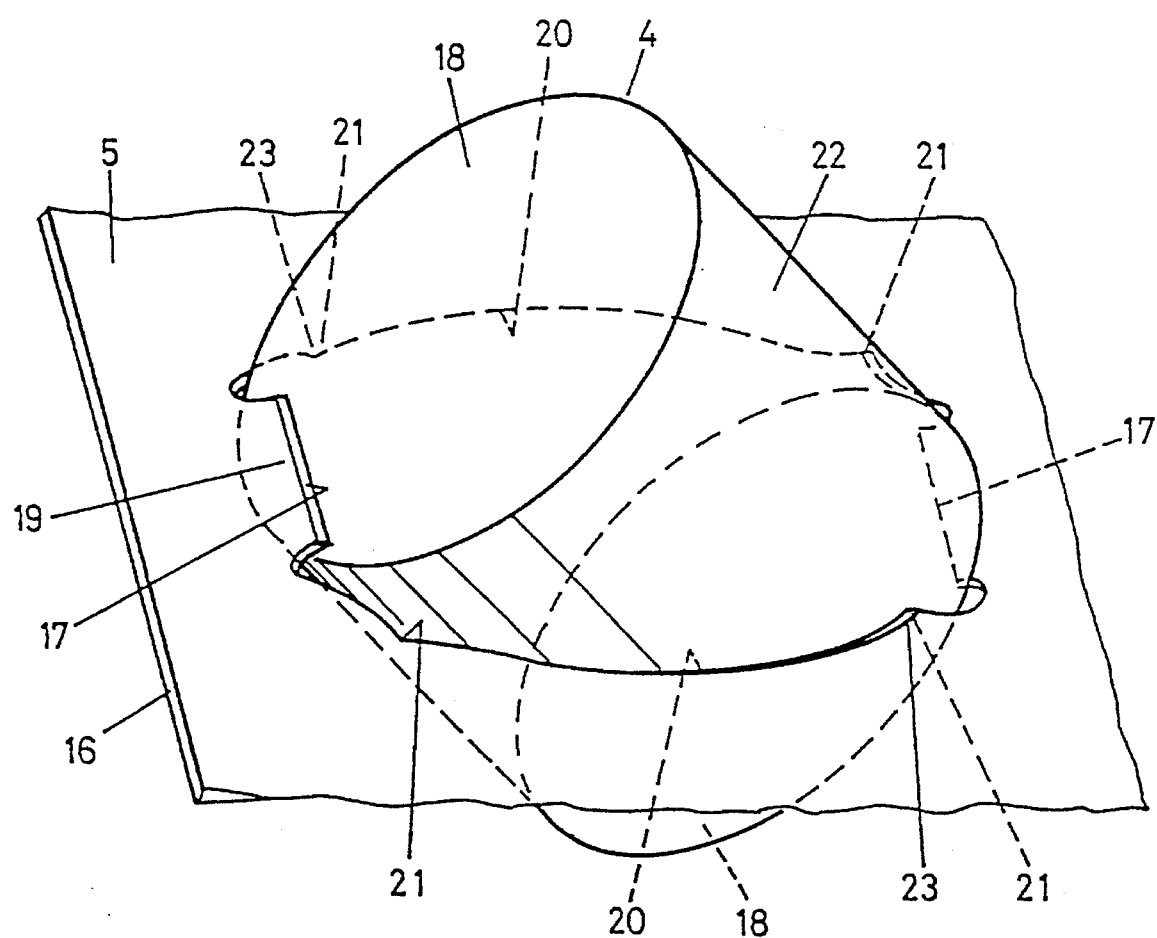
FIG. 5 shows a perspective representation of a roller inserted into a cage opening.

The variant according to FIGS. 4 and 5 differs from the one according to FIG. 3 by the contact points 21 being formed on plastically and/or elastically deformed tabs 23. This enlarges the contact surface and reduces wear. The plastic pressure of the shoulders 17 and of the contact points 21 through the tabs 19, 23 has a certain braking effect on the rolls 4, which is desirable in some applications.

All the rollers 4 of a row preferably have the same orientation and are at a right angle to the orientation of the rollers of the other row. With this arrangement, if the tracks 11 are worn, the cage 5 with the rollers 4 simply can be turned by 180 degrees. Thus, the rollers 4 now run on the other, unworn tracks 11. The lifetime of the rails 2, 3 can be doubled in this way.

On the other hand, if the linear bearing must transmit considerable transverse forces in one direction, it may be appropriate to install some of the rollers 4 with an opposite orientation in that row which is not subject to stress from these transverse forces. In this way, the linear bearing can easily be adapted to the load that must be transmitted.

The linear bearing according to the invention is much smaller than a cross-roll bearing with the same load capacity.

The cage 5 can simply be stamped from a flat ribbon and can be manufactured economically. Preferably it consists of metal, but can also be made of plastic. The cage according to the invention can be used advantageously also for a cross-roll bearing, that is, for a linear bearing with only a single row of rollers 4.

In the modifications of FIGS. 6 and 7, analogous parts carry the same reference symbols, so that no detailed description of these parts is necessary. In these modifications, the rolling elements are the balls 24. These are again held positively in the cage 5 by plastically and/or elastically deformed tabs 23 of the cage 5.

In the linear ball bearing 25 according to FIG. 6, the balls 24 have a four-point contact in the grooves 10. In the linear ball bearing 26 according to FIG. 7, the grooves 10' have a cross section in the shape of a circular segment, and the balls 24 have a two-point contact.

We claim:

1. A cage for a linear antifriction bearing including a plurality of rollers, each having opposing frontal surfaces and a cylindrical outer surface, the diameter of each said roller being larger than the axial length of each said roller, the cage comprising a flat, plane ribbon which has a row of openings at regular intervals, in each of which one of said rollers is held form lockingly in all directions, the axis of the rollers being inclined to the plane of the cage by about 45°, each opening having at least two contact shoulders running essentially parallel to the longitudinal extension of the cage, the contact shoulders of each opening contacting the two frontal surfaces of said respective roller at diametrically opposed spaces, two arc shaped edges joining the contact shoulders and having at least two contact points contacting the cylindrical outer surface of said rollers.

2. The cage of claim 1, wherein the cage is deformed at its contact points with the rollers, in order to increase its contact surface with the rollers.

3. The cage of claim 2, wherein at least one of the contact shoulders is formed on a spring-type tab and is pre-tensioned against the frontal surfaces.

4. The cage of claim 1, wherein at least one of the contact shoulders is formed on a spring-type tab and is pre-tensioned against the frontal surfaces.

5. The cage of claim 1, wherein the cage has several rows of said openings.

6. A linear anti-friction bearing comprising a first rail and a second rail, wherein each of said first and second rails has at least one V-shaped groove with tracks disposed at approximately a right angle to one another at mutually facing surfaces of said first and second rails, each of said two grooves of said first surfaces of said first and second rails, each of said two grooves of said first and second rails being situated opposite one another, said two mutually opposite grooves forming a square in cross section; a cage with at least one row of openings and containing a plurality of rollers, each having opposing frontal surfaces and a cylindrical outer surface, the diameter of each said roller being larger than the axial length thereof, the cage comprising a flat, plane ribbon which has said at least one row of openings at regular intervals, in each of which one of said rollers is held form lockingly in all directions, the axis of the rollers being inclined to the plane of the cage by about 45°, each opening having at least two contact shoulders running essentially parallel to the longitudinal extension of the cage, the contact shoulders of each opening contacting the two frontal surfaces of said respective roller at diametrically opposed spaces, two arc shaped edges joining the contact shoulders and having at least two contact points contacting the cylindrical outer surface of said rollers, the cylindrical outer surface of the rollers rolling on opposed parallel tracks of said grooves.

7. The linear bearing of claim 6, wherein the first and second rails have identical cross sections.

8. The linear antifriction bearing of claim 6 wherein the cage is formed with a flat, plane ribbon which has at least two rows of openings at regular intervals, in each of which one of the rollers is held form lockingly and wherein each of said first and second rails has at least two v-shaped parallel grooves.

9. The linear bearing of claim 8, wherein all the rollers that roll off in one of the grooves have the same orientation.

10. The linear antifriction bearing of claim 8; wherein all of the rollers that roll off in one of the grooves have the same orientation.

\* \* \* \* \*